(12) United States Patent
Sadasivan et al.

(10) Patent No.: US 8,706,858 B2
(45) Date of Patent: Apr. 22, 2014

(54) METHOD AND APPARATUS FOR CONTROLLING FLOW OF MANAGEMENT TASKS TO MANAGEMENT SYSTEM DATABASES

(75) Inventors: Ashok Sadasivan, Sunnyvale, CA (US); Gurudas Somadder, San Jose, CA (US); Raymond Marriner, Perth (CA)

(73) Assignee: Alcatel Lucent, Paris (FR)

( * ) Notice: Subject to any disclaimer, the term of this patent is extended or adjusted under 35 U.S.C. 154(b) by 295 days.

(21) Appl. No.: 13/006,815

(22) Filed: Jan. 14, 2011

(65) Prior Publication Data
US 2011/0106934 A1    May 5, 2011

Related U.S. Application Data

(63) Continuation-in-part of application No. 12/104,614, filed on Apr. 17, 2008.

(51) Int. Cl.
*G06F 15/173*    (2006.01)

(52) U.S. Cl.
USPC ............................ 709/223; 709/219; 709/227

(58) Field of Classification Search
USPC ........................... 709/223, 226–227; 718/100
See application file for complete search history.

(56) References Cited

U.S. PATENT DOCUMENTS

| | | | |
|---|---|---|---|
| 6,449,641 B1 | 9/2002 | Moiin et al. | |
| 6,675,209 B1 | 1/2004 | Britt | |
| 6,732,166 B1 | 5/2004 | Woodruff | |
| 6,839,752 B1 | 1/2005 | Miller et al. | |
| 7,266,595 B1 * | 9/2007 | Black et al. | 709/223 |
| 8,051,156 B1 * | 11/2011 | Sharma et al. | 709/223 |
| 2003/1012454 | 5/2003 | Srinivasan et al. | |
| 2003/0126193 A1 * | 7/2003 | Marklund et al. | 709/202 |
| 2006/0059491 A1 * | 3/2006 | Suzuki et al. | 718/100 |
| 2007/0198678 A1 | 8/2007 | Dieberger | |
| 2008/0005522 A1 * | 1/2008 | Paladini et al. | 711/170 |
| 2008/0244072 A1 * | 10/2008 | Broberg et al. | 709/226 |
| 2009/0049162 A1 * | 2/2009 | Kuo et al. | 709/223 |
| 2009/0265450 A1 | 10/2009 | Helmer et al. | |
| 2012/0290694 A9 * | 11/2012 | Marl et al. | 709/223 |

OTHER PUBLICATIONS

Dinesh C. Verma, Mandis Beigi, Raymond Jennings, "Policy Based SLA Management in Enterprise Networks", Proceeding of the International Workshop on Policies for Distributed Systems and Networks, p. 137-152, Jan. 29-31, 2001 [retreived from Internet "http://www.research.ibm.com/people/d/dverma/papers/PolicyWkShop2001.pdf"].*

(Continued)

*Primary Examiner* — Andrew Chriss
*Assistant Examiner* — Romani Ohri
(74) *Attorney, Agent, or Firm* — Wall & Tong, LLP

(57) ABSTRACT

A management task data storage capability is provided for facilitating storage of management task data within a database of a management system, such as a network management system that is managing network elements of a telecommunication network. In one embodiment, the management task data storage capability controls storage of management tasks within a database of a management system based on respective priority levels associated with groups of network devices from which the management tasks are received. In this manner, the management task data storage capability ensures that higher priority network devices are provided an appropriately larger amount of management system resources than lower priority network devices, thereby enabling an appropriately larger amount of management task data storage operations to be performed for higher priority network devices than for lower priority network devices and enabling the use of database resources, for handling management tasks of network devices, to be as effective as possible in view of the priorities of the network.

19 Claims, 8 Drawing Sheets

(56) References Cited

OTHER PUBLICATIONS

International Search Report and Written Opinion of the International Searching Authority dated Jan. 10, 2009 in PCT/IB2009/052787, Alcatel Lucent, Applicant, 14 pages.

Dinesh C. Verma et al., "Policy Based SLA Management in Enterprise Networks," Proceedings of the International Workshop on Policies for Distributed Systems and Networks, p. 137-152, Jan. 29-31, 2001 (retrieved from Internet http://www.research.ibm.com/people/d/dverma/papers/PolicyWkShop2001.pdf).

Mohit, Aron et al., "Cluster Reserves: A Mechanism for Resource Management in Cluster-Based Network Servers," Proceedings of the 2000 ACM Sigmetrics International Conference on Measurement and Modeling of Computer Systems, p. 90-101, Jun. 18-21, 2000, (retrieved from ACM database Apr. 21, 2010).

A.Campbell et al., "A Quality of Service Architecture," ACM Computer Communication Review, vol. 24, No. 2, Apr. 1994, pp. 6-27 (retrieved from ACM database Apr. 21, 2010).

\* cited by examiner

METHOD AND APPARATUS FOR CONTROLLING FLOW OF MANAGEMENT TASKS TO MANAGEMENT SYSTEM DATABASES

CROSS-REFERENCE TO RELATED APPLICATIONS

This application is a continuation-in-part of U.S. patent application Ser. No. 12/104,614, entitled METHOD AND APPARATUS FOR MANAGING COMPUTING RESOURCES OF MANAGEMENT SYSTEMS, filed on Apr. 17, 2008, which is hereby incorporated by reference herein in its entirety.

FIELD OF THE INVENTION

The invention relates to the field of communication networks and, more specifically, to management of computing resources of management systems.

BACKGROUND OF THE INVENTION

A Network Management System (NMS) is a system for managing a network of devices. An NMS utilizes computing resources (e.g., a combination of hardware and software components) to perform various management functions for the network. An NMS must maintain and represent an accurate and near real-time status of the network devices of the network in order to effectively manage the network (i.e., the NMS must maintain state synchronization with the network). An NMS consumes computing resources in maintaining state synchronization with the network.

First, a method of state synchronization that consumes computing resources in an unbounded and/or unpredictable manner often causes the network to become unmanageable due to the NMS running out of available computing resources. Furthermore, certain conditions will exacerbate consumption of the computing resources of the NMS, such as network growth, network device failures, cascading network failures, and the like. These conditions result in an increase in network activity (as the problems are signaled within the network), and, further, also result in a corresponding increase in the activity of the NMS as the NMS attempts to remain synchronized with the network during the network activity.

Second, database resources of the NMS, such as memory, processing, and input/output functions, have limitations that are reached when the number of database access operations exceeds certain threshold levels. Within the context of large telecommunications systems, such as a Long Term Evolution (LTE) 4G system, it is expected that the number of devices interacting with the NMS will be so large that such limitations will be reached even for the most powerful database systems. This is primarily due to the fact that each network device managed by the NMS results in management tasks related to traps (e.g., change notifications), statistical data, resync commands (e.g., reconfiguration update commands), and the like, which have associated management task data which must in turn be stored within the database of the NMS for use by the NMS in managing the network. This data needs to be persistent in order to survive management system restarts, as well as for efficient queries. In existing NMSs, when the maximum input/output data rate of the underlying database of the NMS is exceeded, some of the management tasks to be stored in the database may be delayed or even dropped without being stored. When a management task of a network device is dropped, the network device associated with the dropped management task is out of synchronization with respect to the database of the NMS and, further, once the network device is out of synchronization, all subsequent tasks received from the network device also are dropped (with the exception of a resync task indicative of the network device becoming synchronized). As more network devices become out of synchronization, and their associated management tasks are dropped by the NMS, the load on the database resources of the NMS is reduced. Then, as demand for database resources drops to a level consistent with the capability of the database of the NMS, the network devices that lost synchronization are opportunistically resynchronized by the NMS. Disadvantageously, while this system works, it results in a condition whereby the NMS and associated network devices are negatively impacted when the volume of management tasks strains database resources of the NMS.

SUMMARY

Various deficiencies in the prior art are addressed through a method and apparatus for facilitating storage of management task data within a database of a management system, such as a network management system that is managing network elements of a telecommunication network.

In one embodiment, an apparatus is provided for managing flow of management task data to a database of a management system that is configured for managing a network having a plurality of network devices. The apparatus includes a plurality of management task buffers and a controller. The management task buffers are configured for storing management tasks received at the management system prior to storage of the received management tasks in the database. The management task buffers are associated with a respective plurality of resource groups, where the resource groups have respective portions of resources of the management system allocated thereto and, further, where the resource groups have a respective plurality of weights associated therewith. The controller is configured for controlling flow of management tasks from the management task buffers to the database based on the weights of the resource groups.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF ILLUSTRATIVE EMBODIMENTS

The present invention enables allocation of the resources of a management system that manages a network of devices. The management system may be under the control of a provider. The network devices are organized into groups, and the resources of the management system are allocated to the groups of network devices, thereby enabling efficient utilization of the resources of the management system. The network device groups may be formed and modified in many ways. The resources may be allocated in numerous ways, including static and/or dynamic allocations. The allocation of the resources may be modified in many ways.

Figure 1:
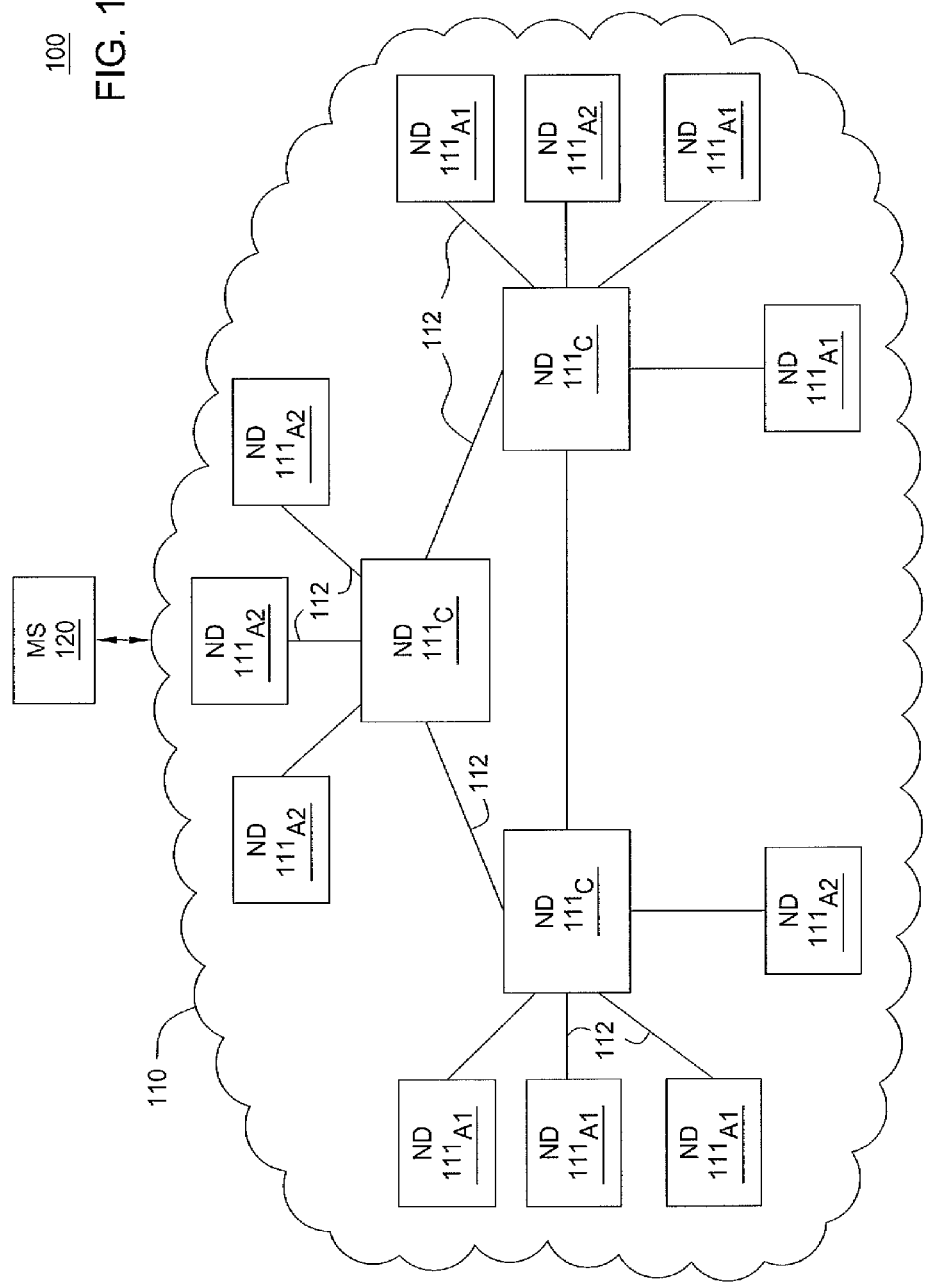
FIG. 1 depicts a high-level block diagram of a communication network architecture including a management system managing a network.

FIG. 1 depicts a high-level block diagram of a communication network architecture. Specifically, the communication network architecture 100 includes a communication network (CN) 110 and a management system (MS) 120. The CN 110 includes a plurality of network devices (NDs) 111. The NDs 111 include a plurality of access devices $111_A$ and a plurality of core devices $111_C$. The access devices $111_A$ and core device $111_C$ communication using communication links (CLs) 112. The MS 120 manages the NDs 111 and CLs 112 of CN 110.

The MS 120 may be any type of management system. For example, MS 120 may be a network provisioning system, a fault monitoring system, or any other system which may manage other network devices. The MS 120 can manage CN 110 using any management protocol (e.g., Simple Network Management Protocol (SNMP), Common Management Information Protocol (CMIP), Transaction Language 1 (TL1), Extensible Markup Language (XML), and the like). The MS 120 can communicate with NDs 111 of CN 110 using any underlying communications technologies.

The MS 120 may be associated with and/or under the control of any provider. For example, MS 120 may be associated with and/or under the control of a network provider (e.g., a provider which provides the network devices being managed and/or the MS 120 which is used to managed the network devices), a service provider (e.g., a provider which provides one or more services over the network devices being managed by MS 120), a customer (e.g., where the customer is a large enterprise customer performing its own network management functions), and the like, as well as various combinations thereof. The MS 120 may be associated with and/or under the control of any other entity.

The MS 120 may perform many functions. For example, MS 120 may interact with the NDs 111 of CN 110 in order to maintain a current view of the network (i.e., to remain synchronized with the network), perform management functions within the network (e.g., provision connections and services within the network, correlate fault monitoring data received from the network, or any other management functions), and the like, as well as various combinations thereof. The MS 120 may perform any other management functions.

There are many issues associated with managing a network of network devices using a management system, such as in the network depicted and described with respect to FIG. 1.

A management system user typically expects different degrees of responsiveness and state synchronization from the management system based on the role of the target network device. For example, since core devices are more important than access device (due, at least in part, to the capacity of communications supported by the core devices relative to the access devices), a management system user would expect much better responsiveness and more accurate state synchronization for core devices than would be expected for individual ones of the access devices.

A management system typically faces an issue in managing a large network having many network devices providing many different roles within the network (e.g., access, aggregation, edge, core, service applications, and the like). A large network will typically have a much larger number of access devices than edge device and core devices; however, maintaining state synchronization for core device forming the backbone of the network is clearly more important than maintaining state synchronization of individual ones of the access devices (i.e., since failure of one of the core devices would be far more catastrophic than failure of even a number of the access devices).

These issues indicate that network devices must be treated differently within a management system based on characteristics of the network devices (e.g., based on roles of the network devices within the network, capacities supported by the network devices, and the like) because failure to do so would result in consumption of the management system computing resources by the larger number of less important network devices and corresponding computing resource starvation for the smaller number of more important network devices, thereby resulting in a loss of state synchronization of the management system with the more important network devices and, thus, preventing the management system from managing critical services.

These issues manifest themselves in a number of ways during the lifecycle of a management system.

For example, these issues may occur during network discovery, which significantly taxes the management system because of the number of operations that the management system must perform (e.g., creation of objects representing the network devices, database updates, processing event notifications, raising alarms, and the like).

For example, these issues may occur during normal operations. For example, these issues may occur when the management system performs connectivity checks on each of the network devices (e.g., where connectivity checks for the more important network devices are waiting for computing resources of the management system that have been consumed performing connectivity checks on the larger number of less important network devices). These issues may occur during any other normal functions performed by the management system.

For example, these issues may occur during network outages, where a cascading failure of a bunch of less important network devices will cause corresponding processing in the management system to consume all of the available computing resources of the management system. This leaves no computing resources available at the management system for processing information associated with the more important network devices (e.g., for performing database updates, processing notification messages, raising alarms, and performing other required functions)

For example, these issues may occur during loss of synchronization, where the management system realizes that it must react differently to a network device because it is out of synchronization with the network device due to missed synchronization checkpoints. The criteria that the management system uses to decide whether it needs to re-read state information from the network might be different based on the roles and capabilities of different network devices, however, without a capability to vary handling of such situations, the management system would be forced to resort to worst case handling, which would be prohibitively expensive in almost all cases.

For example, these issues may occur due to the latency of the network by which the network devices are connected, which affects the ability of the management system to maintain real-time visibility of network devices. The network latency is affected not only by the latency of interconnections between network devices, but also by the actual data/control plane load on the network devices, such that the management system needs to have a capability to segregate poorly performing portions of the network in a way that prevents the poorly performing portions of the network from affecting the manageability of the rest of the network.

For example, these issues may occur in situations in which the management system must provide preferential treatment to one type of network device over other types of network devices (since treating all network device types equally would still cause resource starvation at the management system). Similarly, these issues also occur in situations in which the management system must provide preferential treatment to one network device within one particular type of network device (since treating all network devices of a given type equally would still cause resource starvation at the management system).

The MS 120 is adapted to support computing resource allocation functions in a dynamic manner in order to alleviate each of the above-described issues and provide many other benefits.

The MS 120 includes computing resources 121 adapted for use in performing such functions. The computing resources 121 may include any resources which may be utilized by MS 120 in managing CN 110. For example, computing resources 121 include processing resources (e.g., CPU resources), memory resources, disk resources, input/output resources, and the like, as well as various combinations thereof. The computing resources 121 may include any other hardware and/or software resources which may be utilized by MS 120 in performing management functions.

The computing resources may be measured in many ways and, thus, may be utilized in many ways. For example, CPU resources may be measured in terms of worker threads available to perform processing functions. For example, memory resources and disk space resources may be measured in terms of capacity. For example, input/output resources may be measure in terms of bandwidth. The computing resources 121 may be measure in many other ways.

The MS 120 is adapted to partition NDs 111 into groups (denoted as network device groups). The NDs 111 may be partitioned into network device groups in many ways. The MS 120 is adapted to allocate different portions of computing resources 121 among the network device groups. The NDs 111 in a network device group may utilize the portions of computing resources 121 allocated to that network device group. The computing resources 121 may be allocated among the network device groups in many ways.

Figure 2:
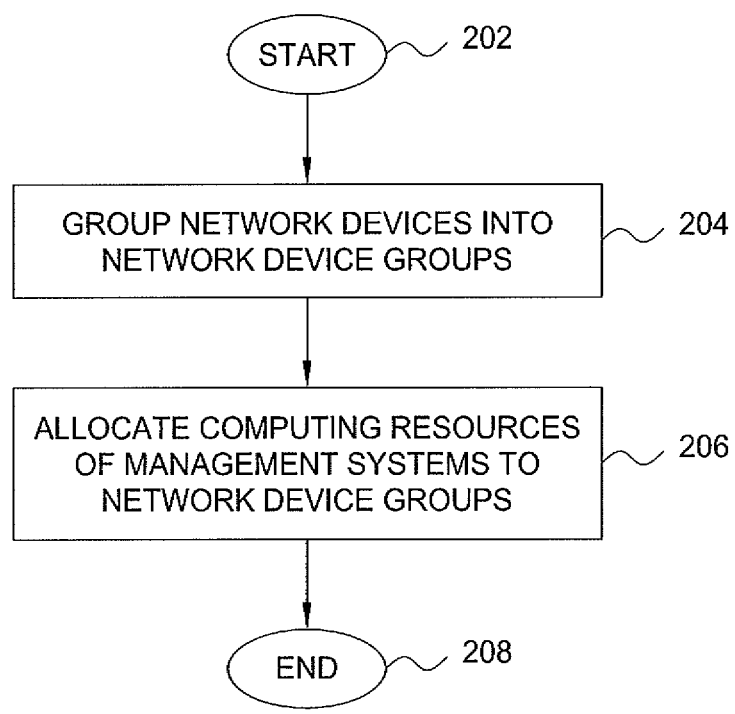
FIG. 2 depicts a method for allocating computing resources of the management system for managing the network of FIG. 1.

The operation of MS 120 in partitioning NDs 111 into network device groups and allocating computing resources 121 among network device groups may be better understood with respect to FIG. 2.

FIG. 2 depicts a method according to one embodiment of the present invention. Specifically, method 200 of FIG. 2 includes a method for allocating computing resources of a management system to network device groups including network devices of the network managed by the management system. Although depicted and described as being performed serially, at least a portion of the steps of method 200 may be performed contemporaneously, or in a different order than depicted and described with respect to FIG. 2. The method 200 begins at step 202 and proceeds to step 204.

At step 204, network devices are organized into network device groups. The network devices may be organized into the network device groups in a number of ways. In one embodiment, each network device group includes at least one network device. In one embodiment, each network device is assigned to at least one of the network device groups. The network devices may be partitioned into network device groups in many other ways.

The organization of the network devices into network device groups may be based on one or more factors.

In one embodiment, partitioning of network devices into network device groups may be performed by identifying, for each network device, at least one characteristic associated with the network device, and grouping network devices into network device groups based on the determined characteristic(s) of the respective network devices.

The characteristic(s) of a network device that is used to determine the network device group to which that network device is assigned may include one or more of a role of the network device within the network, a set of capabilities supported by the network device, a set of services supported by the network device, a customer or set of customers supported by the network device, a type of technology of the network device, a capacity of the network device, a geographic location at which the network device is deployed, and the like, as well as various combinations thereof.

The characteristic(s) of a network device that is used to determine the network device group to which that network device is assigned may be indicative of an importance of the network device to the network (relative to other network devices in the network), and, thus, the importance of the network device to the service provider. In one embodiment, an importance measure may be assigned to the network device based on the one or more characteristics (and also taking into account importance levels assigned to other network elements since importance of network devices within the network is relative).

Thus, since each network device has an associated importance that is based on the characteristic(s) used to assign the network device to a network device group, and since like network devices having similar characteristics may be grouped into the same network device groups, the importance of each network device group (relative to other network device groups) may be determined based on the importance of the respective constituent network devices of the network device groups and, further, the importance of each network device group may be used to determine allocation of computing resources among the network device groups.

The network device groups may be modified. An existing network device group may be split to form multiple network device groups or multiple network device groups may be merged to form fewer network device groups. An existing network device group may be deleted (and, optionally, if the network devices remain active in the network, the network device may be reassigned to other groups). A new network device group may be created (e.g., including new network devices or network device from other groups). The membership of existing network device groups may be modified (e.g., one or more network devices may be reassigned from one network device group to one or more other network device groups).

The modification of network device groups may be performed in response to one or more events. For example, network device groups may be modified in response to customer desires or needs, changes to the topology of the network (e.g., where older network resources are demoted due to the addition of newer, more important network resources), changes to services supported by the network, and the like, as well as various combinations thereof.

The modification of network device groups may be performed based on any information (e.g., information associated with the network device groups prior to modification, information associated with the event that triggers the modification of the network device groups, and the like, as well as various combinations thereof). The modification of network device groups may be performed at any time (e.g., prior to runtime and/or at runtime, and may continue to be performed as needed and/or desired).

The network devices may organized into network device groups with any granularity. Thus, organization of network devices into network device groups is not limited to embodiments in which each network device is assigned to one of the network device groups as a complete unit. In one embodiment, for example, portions of networks device may be independently assignable (e.g., network elements may be assignable at the chassis level, shelf level, slot level, and the like). In one embodiment, for example, groups of network devices may be assignable to a network device group.

At step 206, resources of the management system are allocated to the network device groups.

The resources may be allocated to the network device groups in a number of ways.

In one embodiment, resources of the management system may be allocated by determining a total amount of resources available to be allocated by the management system, and allocating respective portions of the total amount of resources to the network device groups. In one embodiment, for example, the resources of the management system may be allocated based on the respective importance levels of the network device groups. In one embodiment, for example, the resources of the management system may be allocated based on respective amounts of resources expected or predicted to be used or needed by the network device groups. The total amount of resources may be allocated based on various other factors.

In one embodiment, resources of the management system may be allocated to network device groups using resource groups. In one such embodiment, resources of the management system may be allocated by assigning resources of the management system to resource groups, and associating the resource groups and the network device groups such that each network device group may utilize the resources of the resource group(s) with which that network device is associated.

The resources of the management system may be assigned to the resource groups in any manner. In one embodiment, total available resources of the management system are determined and the total available resources are apportioned among resource groups. The total available resources may be apportioned among the resource groups in any manner (e.g., based on an importance of the network device group(s) with which each resource group is expected to be associated, based on resource utilization data measured on the management system, and the like).

The resource groups and the network device groups may be associated in any manner. In one embodiment, resource groups are assigned to network device groups (e.g., each resource group is assigned to provide resources for one or more of the network device groups). In one embodiment, network device groups are assigned to resource groups (e.g., each network device group is assigned to one or more of the resource groups). The resource groups and the network device groups may be associated in many other ways.

The associations between the resource groups and the network device groups may be modified. A resource group may be reassigned from serving one or more network device groups to serving one or more other network device groups. A network device group may be reassigned from being served by one or more resource groups to being served by one or more other resource groups.

The modification of associations between the resource groups and the network device groups may be performed at any time and for any reason.

The modification of associations between resource groups and network device groups supports situations in which the relative importance of different network devices of the same type can be different based on customer needs. This would be handled by allowing a network device(s) or network device group(s) to be moved to a different resource group(s) at runtime The modification of associations between resource groups and network device groups supports situations in which a network device(s) of a network device group(s) needs to be temporarily isolated for one or more reasons (e.g., because associated communication latency of the target network device(s) is affecting the rest of the network devices in the group).

The modification of associations between resource groups and network device groups may be helpful in various other situations.

In one embodiment, in which allocation of management system resources is performed using resource groups, the resource groups may be modified.

The resource groups may be modified in many ways. An existing resource group may be split to form multiple resource groups or multiple resource groups may be merged to form fewer resource groups. An existing resource group may be deleted (and the associated resources reassigned to other groups). A new resource group may be created (e.g., including new resources or resources from other groups). The composition of existing resource groups may be modified (e.g., one or more resources may be reassigned from one resource group to one or more other resource groups).

The modification of resource groups may be performed in response to one or more events. For example, resource groups may be modified in response to one or more of modifications to the available resources of the management system, modifications to the network device groups (which may be modified in response to various other events described herein), resource utilization information measured at the management system (e.g., based on interactions of the management system with the network), and the like, as well as various combinations thereof.

The modification of resource groups may be performed based on any information (e.g., information associated with the resource groups before they are modified, information associated with the event that triggers the modification, information associated with the network device groups, and the like, as well as various combinations thereof). The modification of resource groups may be performed at any time (e.g., prior to runtime and/or at runtime, and may continue to be performed as desired and/or needed).

The allocation of network resources of the management system to network device groups may be static and/or dynamic (such that borrowing and lending of resources between groups is or is not permitted). The network device groups may all have static allocations of resources such that borrowing of resources between network device groups is not permitted. The network device groups may all have dynamic allocations of resources such that borrowing of resources between network device groups is permitted. A combination of such static allocations and dynamic allocations may be supported for different network device groups formed for a management system.

A network device group may be restricted from borrowing resources from other network device groups under any circumstances. A network device group may be restricted from borrowing resources from other network device groups unless a condition (or conditions) is satisfied. A network device group may be permitted to borrow resources from one other network device group. A network device group may be permitted to borrow resources from multiple other network device groups (e.g., equally without any priority specified, in a priority order such that the network device group will borrow from certain network device groups before borrowing from other network device groups, and the like, as well as various combinations thereof).

A network device group may be permitted to borrow all resources of another network device group(s). A network device group may be permitted to borrow all available resources of another network device group(s). A network device group may be permitted to borrow resources of another network device group(s) for as long as needed. A network device group may be permitted to borrow resources of another network device group until those resources are needed by the other network device group. A network device may borrow resources of one or more other network device groups in many other ways.

As an example, referring to FIG. 1, assume that a first network device group includes access devices $111_A$ and a second network device group includes core devices $111_C$. As one example, the first network device group may be prevented from borrow resources from the second network device group, but the second network device group may be permitted to borrow resources from the first network device groups (e.g., to ensure that there are always enough resources available for the more important core devices). As another example, the first network device group may be permitted to borrow 10% of the available resources of the second network device group, while the second network device group is permitted to borrow any available resources of the first network device group. The resources may be borrowed/shared in many other ways.

In other words, a network device group is allowed to temporarily exceed the resources assigned to the network device group (e.g., resources assigned to one network device group may temporarily utilize resources that are assigned to one or more other network device groups, but that are not currently being used by the one or more other network device groups). In this manner, all available resources of the management system may be utilized as long as there is some function to be performed, while also maintaining the allocation of the resources of the management system to the network device groups.

In such embodiments, in other words, under certain conditions, some network device groups may temporarily borrow resources assigned to other network device groups (and return the borrowed resources either when they are no longer required, or when the network device group(s) lending the resources needs those resources). For example, one network device group may borrow resources one or more other network device groups in response to peak network traffic conditions, in response to network failure conditions, and the like, as well as various combinations thereof.

In one embodiment, allocation of resources among the network device groups may be modified (e.g., not temporarily, where one network device group borrows resources of one or more other network device groups, but, rather, permanently where the baseline allocation of resources to the network device group is modified). This reallocation is permanent in that the management system will not revert to the previous allocation when the condition that triggered the reallocation clears; however, it should be noted that the permanent reallocation of resources of the management system may continue to be modified temporarily (i.e., where network device groups borrow resources from each other) and permanently. The reallocation may be performed automatically (e.g., in response to one or more conditions) and/or manually (e.g., by one or more administrators of the service provider).

In one such embodiment, reallocation of resources among the network device groups may be performed by collecting resource utilization data (at the management system) based on interactions of the management systems with the network (e.g., by initiating a network discovery process, or any other means of collecting such data), and reallocating at least a portion of the resources among at least a portion of the network device groups based on the resource utilization data. This reallocation of resources may be performed at runtime, and may continue to be performed as needed. This reallocation of resources provides a larger margin of error in the initial estimates of resource allocation made before runtime since these initial allocations may be modified in real time based on measured resource utilization data.

In another such embodiment, reallocation of resources among the network device groups may be performed in response to detecting that one or more network device groups is regularly borrowing resources allocated to one or more other network device groups. This condition may be measured in any manner (e.g., the number of times that a network device group borrows resources in a given period of time, the amount of resources that a network device group borrows in a given period of time and the like, as well as various combinations thereof). This condition may be determined in any manner (e.g., using counters, thresholds, and the like, as well as various combinations thereof).

The permanent reallocation of resources among the network device groups may be performed in response to many other conditions. For example, reallocation of resources among the network device groups may be performed in response to one or more of a change to the network device groups, a change in the total amount of resources of the management system, a change to the composition of the network (e.g., in terms of numbers of different types of network devices deployed in the network), and the like, as well as various combinations thereof). The reallocation of resources among the network device groups may be performed in many other ways.

In some embodiments, in which resources of the management system are allocated to different resource groups, one or more of the resource groups may be permitted to exceed its allocation of resources. A resource group may be permitted to exceed its allocation only if other resource groups are not affected (which may be all other resource groups, some of the other resource groups, and the like). A resource group may be permitted to exceed its allocation regardless of whether or not other resource groups are affected (which may be all other resource groups, some of the other resource groups, and the like).

In some embodiments, in which resources of the management system are allocated to different resource groups, allocation of resources among the resource groups may be modified (e.g., not temporarily, where one resource group borrows resources of one or more other resource groups, but, rather, permanently where the baseline allocation of resources to the resource group is permanently modified in that the management system will not revert to the previous allocation when the condition that triggered the reallocation clears). The reallocation of resources among resource groups may be performed automatically (e.g., in response to one or more conditions) and/or manually (e.g., by one or more administrators of the service provider).

In such embodiments, the reallocation of resources among resource groups may be performed by collecting resource utilization data based on interactions of the management systems with the network (e.g., so that an inefficiently configured management system can self-tune its allocation of resources to resource groups as appropriate based on management system activity), in response to detecting that one or more resource groups is regularly borrowing resources allocated to one or more other resource groups, in response to a change to the network device groups, in response to a change in the total amount of resources of the management system, in response to a change to the composition of the network, and the like, as well as various combinations thereof). The reallocation of resources among the resource groups may be performed in many other ways.

In other words, in embodiments in which resources of the management system are allocated to different resource groups, the resource groups may be managed in a manner similar to the manner in which network device groups may be managed (e.g., enabling various combinations of temporary borrowing of resources, permanent reallocation of resources, and the like, as well as various combinations thereof).

In such embodiments, management of the resource group may be performed in place of management of network device groups and/or group may be performed in conjunction with management of network device groups. Thus, in this manner, the management system is provided complete flexibility to manage resources in a manner tending to optimize total system throughput of the management system.

In one embodiment, the total available resources of the management system may be modified. The total available resource may be increased or decreased at any time. The total available resources may be modified for any reason (e.g., anticipated need, detected need, and the like). For example, the CPU resources may be increased in anticipation of the addition of new network devices to the network. For example, the disk space of the management system may be decreased in response to a determination that disk space never even approaches full utilization under worst case conditions. In one embodiment, the total available resources of the management system may be modified in response to a change in the resource groups generated for the management system (e.g., in response to deletion/creation of resource groups). The modification of the total available resources of the management system may trigger any other modifications described herein (e.g., modification of one or more network device groups, modification of one or more resource groups, modification of resource allocation, and the like, as well as various combinations thereof).

At step 208, method 200 ends. Although depicted and described as ending (for purposes of clarity), the allocation of resources to network device groups that results from execution of method 200 may continue to be modified as needed or desired. A method for modifying management of resources of a management system is depicted and described herein with respect to FIG. 3.

With respect to FIG. 2, as one example, referring to FIG. 1, access devices $111_A$ may be assigned to a first network device group (based on their respective roles as access devices) and core devices $111_C$ may be assigned to a second network device group (based on their respective roles as core devices). In this example, since the core devices $111_C$ are deemed more important than the access devices $111_A$, the second network device group is deemed to be more important than the first network device group, and, thus, more of the computing resources 121 may be allocated to the second network device group than to the first network device group.

With respect to FIG. 2, as another example, again referring to FIG. 1, access devices $111_{A1}$ may be assigned to a first network device group (based on their roles as access devices and that they support services for an important client), access devices $111_{A2}$ may be assigned to a second network device group (based on their respective roles as access devices and that they support services for smaller, less important clients), and core devices $111_C$ may be assigned to a third network device group (based on their roles as core devices). In this embodiment, the relative importance of the network device groups may be ranked as follows: third network device group (highest), first network device group, second network device group (lowest), and, thus, computing resources 121 may be allocated accordingly.

In continuation of the first example, since the core devices $111_C$ are deemed to be more important than the access devices $111_A$, more of the computing resources 121 of management system 120 may be allocated to the first network device group than to the second network device group. For example, 70% of the CPU resources, 70% of the memory resources, 40% of the disk space resources, and 40% of the input-output resources may be assigned to the first network device group, while the remaining computing resources 121 (i.e., 30% of the CPU resources, 30% of the memory resources, 60% of the disk space resources, and 60% of the input-output resources) may be assigned to the second network device group.

Figure 3:
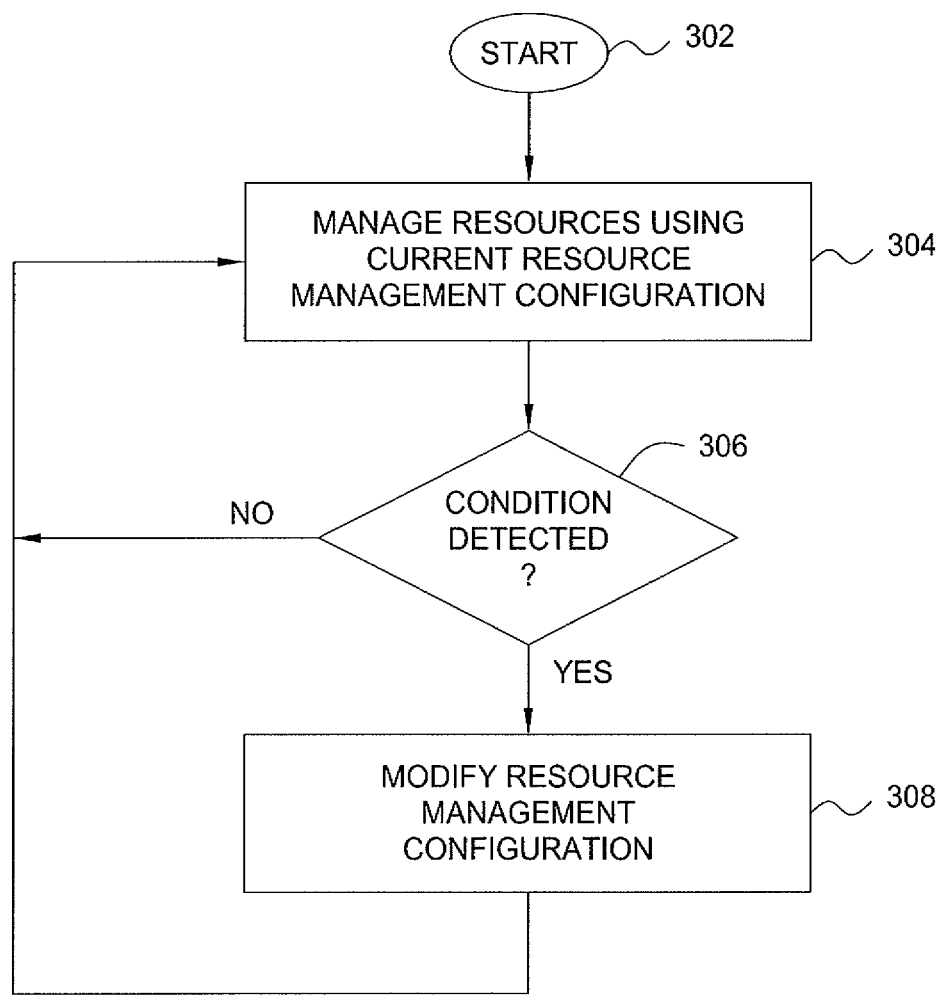
FIG. 3 depicts a method for dynamically modifying management of the computing resources of a management system.

FIG. 3 depicts a method according to one embodiment of the present invention. Specifically, method 300 of FIG. 3 includes a method for dynamically modifying management of the computing resources of a management system. Although depicted and described as being performed serially, at least a portion of the steps of method 300 may be performed contemporaneously, or in a different order than depicted and described with respect to FIG. 3. The method 300 begins at step 302 and proceeds to step 304.

At step 304, resources of the management system are managed using the current resource management configuration. For example, the resources of the management system are managed based on the currently established network device groups, resource allocations to the existing device groups, and the like.

At step 306, a determination is made as to whether a condition is detected. If a condition is not detected, method 300 returns to step 304 (i.e., the resources of the management system continue to be managed according to the current configuration until an event that triggers a change to the current configuration is detected). If a condition is detected, method 300 proceeds to step 308.

The condition may be any condition which may trigger modification of the current resource management configuration. For example, the condition may be one or more of an event in the network, a change in the network (e.g., addition/removal of network devices from the network, changed to the network topology, addition/removal of services supported by the network, and the like), a change in the computing resources of the management system, resource utilization information for the management system, a change request entered by a user, and the like.

At step 308, the resource management configuration is modified (i.e., management of the resources of the management system is modified).

The management of the resource of the management system may be modified in many ways. For example, management of the resources of the management system may be modified by one or more of changing network device groups, changing resource groups, reallocating resources among resource groups, temporarily reallocating resources between network device groups, permanently reallocating resources between network device groups, and the like, as well as various combinations thereof.

From step 308, method 300 returns to step 304, such that the resources of the management system continue to be managed according to the current configuration until detection of the next event that triggers a change to the current configuration. In this manner, the resources of the management system may continue to be managed on an ongoing basis, as needed or desired, in order to ensure the most efficient possible use of the resources of the management system in support of the management functions provided by the management system.

A management task data storage capability is depicted and described herein.

The management task data storage capability facilitates storage of management task data within a database(s) of a management system, such as a network management system that is managing network elements of a telecommunication network.

In one embodiment, the management task data storage capability controls storage of management tasks within a database of a management system based on respective priority levels associated with groups of network devices from which the management tasks are received. In this manner, the management task data storage capability ensures that higher priority network devices are provided an appropriately larger amount of management system resources than lower priority network devices, thereby enabling an appropriately larger amount of management task data storage operations to be performed for higher priority network devices than for lower priority network devices. Similarly, in this manner, the management task data storage capability ensures that the use of database resources, for handling management tasks of network devices, is as effective as possible in view of the priorities of the network devices and, further, that operation of the database degrades in an intelligent manner whereby more important management tasks are given priority over less important management tasks (e.g., based on the importance of the network devices with which the management tasks are associated) as database resources become constrained. These and various other associated embodiments are depicted and described herein with respect to FIGS. 4-7.

The management task data storage capability has various advantages associated therewith, and may provide various other capabilities. In one embodiment, for example, the management task data storage capability is configured such that, advantageously, the process supporting various embodiments of the management task data storage capability may be implemented using a single processing thread (although it will be appreciated that multiple processing threads may be used). In one embodiment, for example, the management task data storage capability provides an additional ability for enabling the management system to manage quality-of-service requirements via prioritization of the resource groups (and, thus, the network elements associated with the resource groups, respectively). These and other associated advantages and capabilities will be understood by way of reference to FIGS. 4-7.

Although the management task data storage capability is primarily depicted and described herein within the context of facilitating storage of management task data within a database(s) of a network management system in a large telecommunications networks having many network elements which provide management task data for storage within a database(s) of the network management system, it will be appreciated that the management task data storage capability may be utilized for facilitating storage of management task data is a database of any suitable management system having a database(s) storing management task data.

Figure 4:
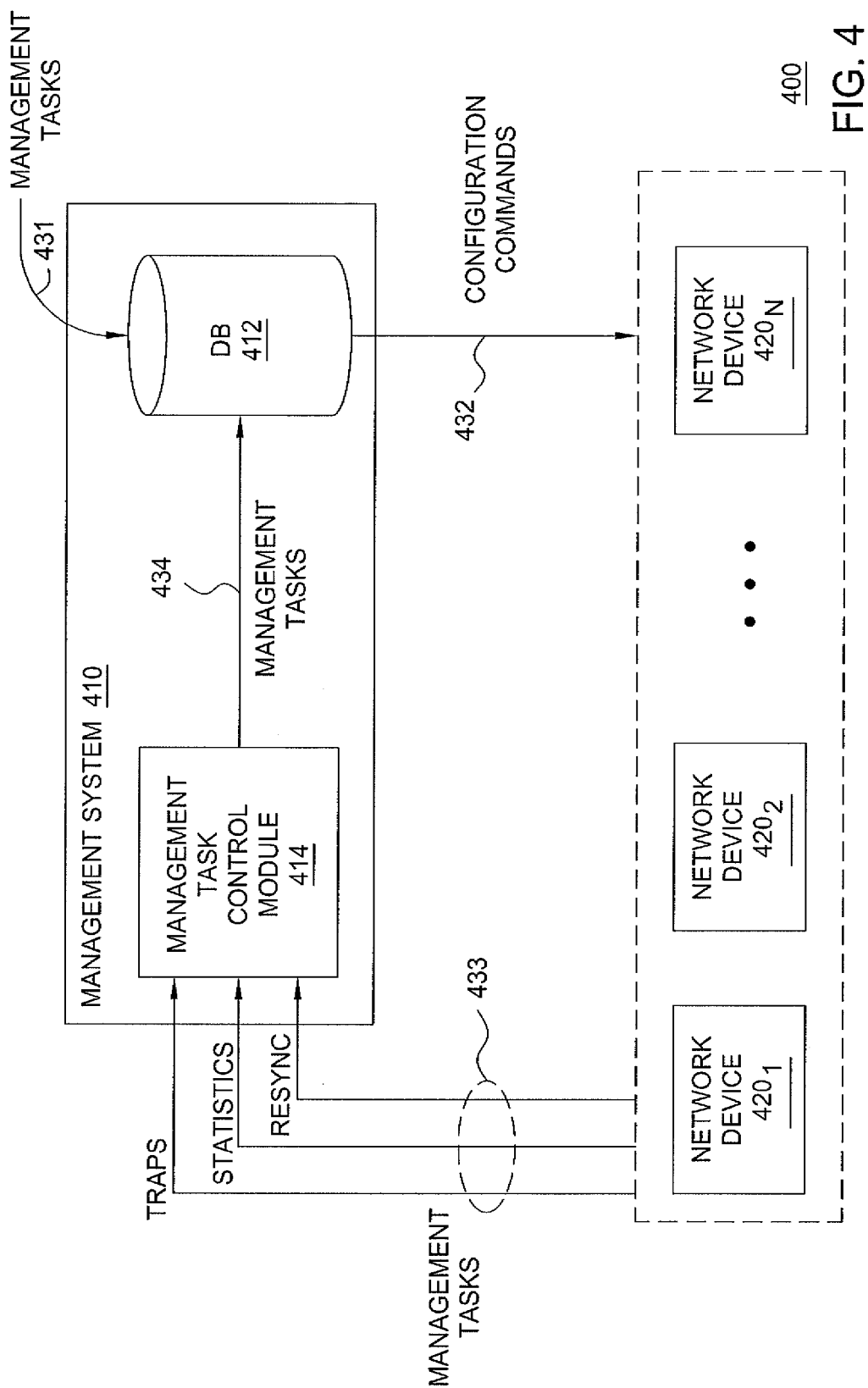
FIG. 4 depicts a high-level block diagram illustrating an exemplary flow of information associated with management of a network device by a management system.

FIG. 4 depicts a high-level block diagram illustrating an exemplary flow of information associated with management of network devices by a management system.

As depicted in FIG. 4, exemplary information flow 400 of FIG. 4 illustrates the flow of information between a management system (MS) 410 and a plurality of network devices (NDs) $420_1$-$420_N$ (collectively, NDs 420). In one embodiment, MS 410 and NDs 420 are implemented as MS 120 and NDs 111 depicted and described with respect to FIGS. 1-3.

As depicted in FIG. 4, MS 410 includes a database (DB) 412 and a management task control module 414. Although primarily depicted and described as being a single, internal database, it will be appreciated that DB 412 may include one or more databases which may be internal and/or external to MS 410.

The DB 412 is configured for storing various tasks related to control of NDs 420 by MS 410. For example, DB 412 is configured to store tasks such as configuration tasks entered by users via a user interface of the MS 410, management tasks received at MS 410 from NDs 420, and the like, as well as various combinations thereof. The tasks have task information associated therewith, and DB 412 is configured for storing the task information of the tasks (e.g., storage of tasks includes storage of the task information of the tasks). For example, for configuration tasks, the task information may include information such as a task type of the task, a source of the task (e.g., the user identifier of the user that initiated the task), an intended destination(s) of the task (e.g., the ND(s) 420 to be configured), configuration details of the task (e.g., the type of configuration to be performed, one or more parameters for the configuration, and so forth), and the like, as well as various combinations thereof. For example, for management tasks, the task information may include information such as a task type of the task (e.g., whether the task is a trap, a statistic, a resync, and the like), a source of the task (e.g., the ND 420 from which the task is received), details of the task (e.g., the type of event with which the task is associated, one or more parameters associated with the task, and so forth), and the like, as well as various combinations thereof.

The management task control module 414 is configured for providing various functions of the management task data storage capability. The management task control module 414 is configured for receiving management tasks from NDs 420 and controlling storage of the received management tasks in DB 412. An exemplary embodiment of the management task control module 414 is depicted and described with respect to FIG. 5.

As depicted in FIG. 4, exemplary information flow 400 includes a number of steps.

At step 431, configuration tasks are stored in DB 412 of MS 410. The configuration tasks may originate from any suitable source. For example, at least a portion of the configuration tasks may be entered by one or more users of MS 410 (e.g., via a user interface of MS 410). For example, at least a portion of the configuration tasks may be received at MS 410 from one or more other systems. The configuration tasks are entered for purposes of configuring one or more of the NDs 420.

As step 432, configuration commands, associated with the configuration tasks, are sent from the MS 410 to the one or more NDs 420 for which the associated configuration tasks were entered. The configuration commands may be generated from the configuration tasks in DB 412 in any suitable manner. The configuration tasks may be propagated from MS 410 to the one or more NDs 420 using any suitable management protocol (e.g., using one or more of SNMP, CMIP, TL1, XML, and the like).

At step 433, each of the NDs 420 propagates management tasks to MS 410. In one embodiment, the management tasks include traps, statistics, and resync commands. The traps may be sent for any suitable reason as will be understood. Similarly, the statistics may be sent for any suitable reason. The resync commands may be sent by the NDs 420 upon receiving and processing one or more of the configuration commands sent by the MS 410. The management tasks may be sent from NDs 420 to MS 410 using any suitable management protocol (e.g., using one or more of SNMP, CMIP, TL1, XML, and the like).

At step 434, the management tasks from NDs 420 are received by management task control module 414, which controls storage of the management tasks in DB 412. The management task control module 414 is configured for: (1) temporarily storing the management tasks prior to storage of the management tasks in DB 412, and (2) controlling the movement of the management tasks from management task control module 414 to DB 412 for storage in DB 412.

In one embodiment, management task control module 414 controls storage of the management tasks and movement of the management tasks to DB 412 for storage in DB 412 using a plurality of resource groups and a plurality of management task buffers.

The resource groups may include respective portions of computing resources of MS 410. For example, a resource group may include, for each of one or more resource types of the MS 410, a portion of the available resources of that resource type (e.g., processor resources, memory resources, disk space resources, and I/O bandwidth resources, and the like). The resources of the resource groups may include any type(s) of computing resources of MS 410 which may be used by MS 410 for performing various management functions for the NDs 420.

The resource groups may be organized, formed, and controlled in any suitable manner. In one embodiment, for example, the NDs 420 are grouped into network device groups (e.g., based on the importance or priority of the NDs 420 within the network), and the resources of MS 410 are allocated to the network device groups of NDs 420 based on the importance or priority of the network device groups (e.g., as determined based on the priorities of the NDs 420 included within the network device groups). In one such embodiment, for example, the resource groups are resource groups as depicted and described herein with respect to FIGS. 1-3 and, thus, may be organized, formed, and controlled as depicted and described herein with respect to FIGS. 1-3. It will be appreciated that the resource groups may be organized, formed, and/or controlled in any other suitable manner.

In this manner, each of the NDs 420 is associated with a resource group, and each resource group has a respective priority or importance level associated therewith (e.g., based on the priority or importance of the network devices that are associated with the resource group and/or on any other suitable basis for assigning a priority or importance level to a resource group). In one embodiment, the priority or importance level of a resource group is represented by a resource weight parameter associated with the resource group, such that the relative importance of resource groups with respect to each other may be determined from the resource weight parameters of the resource groups, respectively.

In one embodiment, each resource group has an associated management task buffer associated therewith. The management task buffer of a resource group is configured for (1) temporarily storing the management tasks received from NDs 420 associated with that resource group prior to storage of those management tasks in DB 412, and (2) propagating the management tasks received from NDs 420 associated with that resource group to DB 412. The management task control module 414 is configured for controlling propagation of the management tasks of the management task buffers to DB 414 based on the respective resource weight parameters of the resource groups with which the management task buffers are associated.

In one embodiment, management task control module 414 controls propagation of the management tasks of the management task buffers to DB 414 based on the respective resource weight parameters of the resource groups with which the management task buffers are associated by using the resource weight parameters to define, for each of the respective resource groups, an approximate number of management tasks of the associated management task buffer to be sent to DB 412 (which also may be referred to herein as being flushed to DB 412) within a given time period.

In one embodiment, management tasks continue to be provided from management task buffers to DB 412, according to the resource weight parameters, in each time period, until all of the management task buffers are empty or until backpressure forces the sending of management tasks to DB 412 to stop. It will be appreciated that, depending on the distribution of management tasks stored in the management task buffers and awaiting storage in DB 412, the storage of management tasks in DB 412 may be adapted such that at least some of the resource groups are able to store more management tasks in DB 412 during a given period of time than would otherwise be possible when performed using the associated resource weight parameters (e.g., where no management tasks are pending for higher-priority resource groups and many management tasks are pending for lower-priority resource groups). It will be appreciated that any suitable backpressure mechanisms may be employed.

As an example, consider an LTE network including PGW elements, SGW elements, and eNodeB elements, where the PGW elements are associated with a first resource group having a resource weight parameter of 100, the SGW elements are associated with a second resource group having a resource weight parameter of 50, and the eNodeB elements are associated with a third resource group having a resource weight parameter of 20. In this example, for each time period, 100 management tasks received from the PGW elements will be sent to DB 412, 50 management tasks received from the SGW elements will be sent to DB 412, and 20 management tasks received from the eNodeB elements will be sent to DB 412. This may repeat for each time period until all of the management task buffers are empty or until backpressure forces a stop to the sending of management tasks to DB 412.

Although primarily depicted and described herein with respect to embodiments in which the resource weight parameters of the resource groups are values that represent the number of management tasks to be sent to the database in a given time period, it will be appreciated that any other suitable values may be used to represent the resource weight parameters. In general, the resource weight parameters may be specified using any suitable values, such that the resource weight parameters of the respective resource groups, considered together, are indicative of the number of management tasks of each resource group to be sent to the database during a given time period.

It will be appreciated that the association of resource groups and management task buffers at an MS may use one or more of a 1:1 association (i.e., a resource group has a dedicated management task buffer), a 1:N association (i.e., a single resource group has multiple dedicated management task buffers, an N:1 association (i.e., multiple resource groups share a management task buffer), and an N:N association (i.e., multiple resource groups share a common group of management task buffers). For purposes of clarity, the management task control module 414 is primarily depicted and described herein with respect to an embodiment in which there is a one-to-one relationship between resource groups of MS 410 and management task buffers of MS 410.

Figure 5:
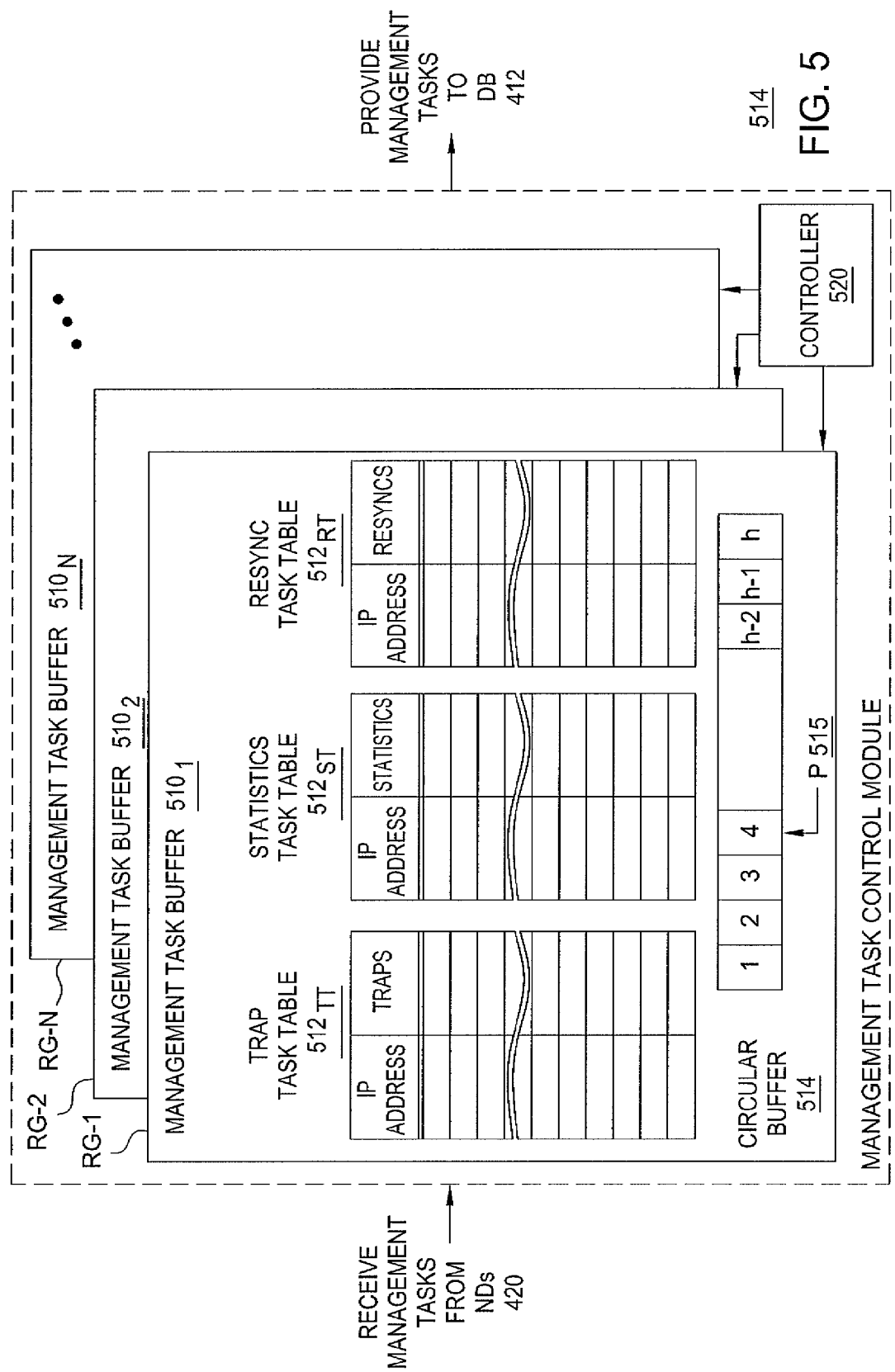
FIG. 5 depicts a high-level block diagram of the management task control module of the management system of FIG. 4.

As noted above, an exemplary use of the management task control module 414 to control storage of management tasks in DB 412 is depicted and described with respect to FIG. 5.

FIG. 5 depicts a high-level block diagram of the management task control module of the management system of FIG. 4.

The management task control module 414 includes a plurality of management task buffers $510_1$-$510_N$ (collectively, management task buffers 510) associated with a plurality of resource groups (denoted as resource groups RG-1 through RG-N), respectively. In general, the association of management task buffers and resource groups is described herein with respect to FIG. 4.

The management task control module 414 further includes a controller 520 in communication with each of the management task control buffers 510. The controller 520 is configured to control storage of management tasks in management task buffers 510. The controller 520 also is configured to control propagation of management tasks from management task buffers 510 to DB 412 for storage in DB 412 according to the resource weight parameters of the RGs with which management task buffers 510 are associated, respectively. As depicted in FIG. 5, these functions of the controller 520 are denoted as RECEIVE MANAGEMENT TASKS and STORE MANAGEMENT TASK on the left and right sides of the management task buffers 510, respectively.

In one embodiment, each of the management task buffers 510 includes a plurality of task tables 512, a circular buffer 514, and at least one pointer 515 into the circular buffer 514.

The plurality of task tables 512 of a management task buffer 510 may be organized in any manner suitable for storing management tasks prior to storage of the management tasks in DB 412.

In one embodiment, for example, the plurality of task tables 512 includes three task tables as follows: (1) a trap task table $512_{TT}$ that is configured for storing management tasks associated with traps received at MS 410 from ones of the NDs 420 associated with the resource group of the management task buffer 510, (2) a statistics task table $512_{ST}$ that is configured for storing management tasks associated with statistics received at MS 410 from ones of the NDs 420 associated with the resource group of the management task buffer 510, and (3) a resync task table $512_{RT}$ that is configured for storing management tasks associated with resync commands received at MS 410 from ones of the NDs 420 associated with the resource group of the management task buffer 510.

Although primarily depicted and described with respect to use of a specific number of task tables 512 (illustratively, three) that are organized for storing management tasks based on a specific characteristic of the management tasks (namely, based on tasks types such as traps, statistics, and resyncs), it will be appreciated that fewer or more tasks tables may be used for storing management tasks at any given management task buffer 510 and, similarly, that the task tables 512 may be organized in any other suitable manner (e.g., based on one or more characteristics other than and/or in addition to task types of the management tasks stored at the management task buffer 510). In one embodiment, for example, a single task table may be used to store all tasks for the management task buffer 510. In one embodiment, for example, multiple task tables may be used for storing tasks of a given task type. In this embodiment, for example, multiple task tables may be used for storing management tasks related to traps (e.g., where the different task tables are based on one or more characteristics such as the NDs 420 from which the traps are received, the relative priority levels of the NDs 420 from which the traps are received, the relative importance of the types of service with which the traps are associated, the relative importance of the end users with which the traps are associated, and the like, as well as various combinations thereof). Similarly, in this embodiment, for example, multiple task tables 512 may be used for storing management tasks related to statistics received from NDs 420, multiple task tables 512 may be used for storing management tasks related to resync commands received from NDs 420, and the like. Various other arrangements are contemplated. In this manner, management tasks may be stored within a management task buffer 510 at any suitable level of granularity which may be needed or desired.

Although primarily depicted and described with respect to use of the same arrangement of task tables for each of the management task buffers 510, it will be appreciated that different arrangements of task tables may be used for different management task buffers 510 of MS 410 (e.g., different numbers of task tables, task tables arranged according to different types of management task characteristics, and the like, as well as various combinations thereof).

As such, it will be appreciated that any suitable numbers and/or arrangements of task tables 512 may be used for any of the management task buffers 510 of MS 410.

The plurality of task tables 512 of a management task buffer 510 may store management tasks in any suitable manner (e.g., storing any suitable management task data of the management tasks, storing the management tasks using any suitable table arrangements, and the like, as well as various combinations thereof). This is represented in FIG. 5 via inclusion, in each of the task tables 512, of: (1) a plurality of columns associated with the types of information to be stored for each management task stored in the task table 512 and (2) a plurality of rows where each row is associated with a management task, and associated management task data of the management task, stored in the task table 512.

In one embodiment, for example, as depicted for the exemplary task tables 512, each task table 512 of a management task buffer 510 includes a first column for storing identifiers of NDs 420 from which stored management tasks are received and a second column for storing management task data of the stored management tasks, respectively. More specifically, the three exemplary task tables $512_{TT}$, $512_{ST}$, and $512_{RT}$ are arranged as follows: (1) trap task table $512_{TT}$ includes an IP ADDRESS column for storing IP addresses of NDs 420 from which traps are received and a TRAP column for storing trap information associated with received traps, (2) statistics task table $512_{ST}$ includes an IP ADDRESS column for storing IP addresses of NDs 420 from which statistics are received and a STATISTICS column for storing the received statistics, and (3) resync task table $512_{RT}$ includes an IP ADDRESS column for storing IP addresses of NDs 420 from which resync commands are received and a RESYNC column for storing the received resync commands, In this manner, for each row of a task table 512, the row of the task table 512 is an entry for a stored management task that identifies an identifier of the ND 420 from which the stored management task is received and the management task data that is associated with the stored management task.

Although primarily depicted and described with respect to use of a specific structure for each of the task tables 512 (illustratively, each of the management tasks being stored on a different row, and including two columns for storing identifiers of NDs 420 and management task data of the stored management tasks), it will be appreciated that the task tables 512 may be structured in any other suitable manner (e.g., using fewer or more columns). Similarly, although primarily depicted and described with respect to storage of specific information for each management task stored in a task table 512 (namely, the identifier of the ND 420 from which the management task is received and the management task data for the management task), it will be appreciated that any other suitable types of information may be stored for each management task.

As described herein, although primarily depicted and described with respect to embodiments in which storage of specific types of management data is controlled (namely, traps, statistics, and resyncs and their associated data), fewer or more types of management data may be stored. For example, where fewer types of management data are stored, each of the management task buffers 510 may be adapted accordingly (e.g., using less task tables 512 and the like). Similarly, for example, various other types of management data are contemplated and may be handled in any suitable manner (e.g., by including such other types of data within one or more of the task tables 512 depicted and described herein, by including such other types of data (and, optionally, at least some of the existing types of data) within one or more additional task tables provided for each of one or more of the management task buffers 510, and the like, as well as various combinations thereof).

The circular buffer 514 of a management task buffer 510 is configured to receive and store management tasks from the plurality of task tables 512 of the management task buffer 510.

The circular buffer 514 of a management task buffer 510 is configured to receive management tasks from the task tables 512 of the management task buffer 510. In one embodiment, management tasks stored in task tables 512 of the management task buffer 510 are provided to the circular buffer 514 of the management task buffer 510 when there is storage space available in the circular buffer 514. The management tasks may be moved from the task tables 512 into the circular buffer 514 in any suitable order, which may be based on one or more characteristics. For example, such characteristics may include one or more of the order in which the management tasks are received at the management buffer 510, relative priorities of the tasks types of the management tasks (e.g., where resyncs have priority over traps which have priority over statistics, or using any other suitable hierarchy of priorities), and the like, as well as various combinations thereof.

The circular buffer 514 of a management task buffer 510 is configured to store management tasks received from task tables 512 of the management task buffer 510. The circular buffer 515 includes a plurality of buffer locations (denoted as buffer locations 1 through h), where each of the buffer locations is configured to store a management task.

The circular buffer 514 of a management task buffer 510 is configured to provide stored management tasks of the management task buffer 510 to DB 412 under the control of controller 520. As described herein, management tasks are moved from the circular buffer 514 of the management task buffer 510 to the DB 412 based on the resource weight parameter of the resource group with which the management task buffer 510 is associated.

The circular buffer 514 of a management task buffer 510 may receive management tasks from task tables 512 and provide management tasks to DB 412 in any suitable manner. In one embodiment, as described herein, the circular buffer 514 of a management task buffer 510 provides such functions using one or more pointers (illustratively, represented using pointer 515 which is denoted as *P). In one such embodiment, the pointer P* points to the location of the next management task to be extracted from the circular buffer 515 and, thus, the location at which the next management task (from one of the task tables 512) is stored is the location prior to the location of the next management task to be extracted (i.e., *P-1). In the exemplary circular buffer 514 of the management task buffer 510 associated with RG-1, the pointer 515 is pointing to the fourth buffer location of the circular buffer 514).

The circular buffers 514 of the respective management task buffers 510 are controlled by controller 520 for propagating the management tasks stored in the circular buffers 514 to the DB 412. As described herein, management tasks are moved from the circular buffers 514 of management task buffers 510 to the DB 412 based on the respective resource weight parameters of the resource groups with which the management task buffers 510 are associated, respectively.

In one embodiment, in order to control movement of management tasks from circular buffers 514 to DB 412 based on the resource weight parameters of the resource groups with which the management task buffers 510 are associated, the pointers 515 of the circular buffers 514 are incremented according to the respective resource weight parameters associated with the circular buffers 514.

In general, the management tasks may be extracted from the circular buffers 514 of the management task buffers 510 for storage in the DB 412, based on the respective resource weight parameters of the resource groups with which the management task buffers 510 are associated, in any suitable manner.

In one embodiment, for example, the management tasks are extracted from circular buffers 514 to DB 412 one at a time. In one such embodiment, for example, the circular buffers 514 are serviced in a round-robin fashion, in accordance with the resource weight parameters of the resource groups with which the management task buffers 510 are associated, by incrementing the pointers 515 of the circular buffers 514 in a round-robin fashion in accordance with the resource weight parameters of the resource groups with which the management task buffers 510 are associated.

In one embodiment, for example, the management tasks are extracted from circular buffers 514 to DB 412 as groups of management tasks. In one such embodiment, for example, the circular buffers 514 are serviced, in accordance with the resource weight parameters of the resource groups with which the management task buffers 510 are associated, by incrementing the pointers 515 of circular buffers 514 by amounts corresponding to the resource weight parameters of the circular buffers 514, respectively. For example, for three management task buffers having three resource groups with resource weight parameters of 100, 50, and 20, respectively, 100 management tasks will be extracted from the circular buffer of the first management task buffer, 50 management tasks will be extracted from the circular buffer of the second management task buffer, and 20 management tasks will be extracted from the circular buffer of the third management task buffer, thereby producing a set of 170 management tasks to be written to the database.

In general, in such embodiments, if a particular circular buffer 514 is not storing any management tasks when it is selected to provide its management task(s), that particular circular buffer 514 may be skipped and the next circular buffer 514 selected to provide its management task(s).

In general, the management tasks may be written to DB 412, based on the respective resource weight parameters of the resource groups with which the management task buffers 510 are associated, in any suitable manner.

In one embodiment, for example, tasks extracted from the circular buffers 514 of the management task buffers 510, based on the respective resource weight parameters of the resource groups with which the management task buffers 510 are associated, may be written to DB 412 serially.

In one embodiment, for example, a complete task set is formed by extracting management tasks from the circular buffers 514 of the management task buffers 510 based on the respective resource weight parameters of the resource groups with which the management task buffers 510 are associated, and the complete task set is then written to DB 412. In such embodiments, the management tasks of the complete task set may be written to DB 412 in any suitable manner (e.g., serially, in parallel, and the like).

In general, this process of moving management tasks from the management task buffers 510 to DB 412 for storage in DB 412 continues until all of the management tasks stored in the management task buffers 510 have been written to DB 412 or a backpressure mechanism causes writing of the management tasks to stop.

In general, movement of management tasks from management task buffers 510 to DB 412 may utilize various resources of MS 410 (e.g., computing resources, memory resources, database I/O resources, and the like). In one embodiment, utilization of the resources of MS 410 for writing management tasks to DB 412 may be managed by MS 410. In one such embodiment, for example, the resources associated with writing of management tasks to DB 412 may be managed using any of the mechanisms depicted and described herein with respect to FIGS. 1-3.

Although primarily depicted and described with respect to use of circular buffers 514 to provide management tasks from management task buffers 510 to DB 412, in other embodiments the circular buffers 514 may be replaced with other types of buffers or may simply be omitted (e.g., such as where the controller 520 is configured for providing management task directly from the task table(s) 512 to the DB 412). In at least some embodiments, the order in which management tasks of a given management task buffer 510 are provided to DB 412 may be controlled (e.g., in a manner similar to the manner in which control of the order in which management tasks are provided from the task tables 512 to the circular buffer 514, such as based on one or more of the order in which the management tasks are received at the management task buffer 512, the relative priority levels of the management tasks, and the like, as well as various combinations thereof).

As described herein, management task control module 414 is configured for receiving management tasks from NDs 420, storing the management tasks prior to storage in DB 412, and controlling storage of the management tasks in DB 412. As management tasks are received at management task control module 414, a determination is made, for each management task, as to which of the management task buffers 510 in which the management task should be stored. This determination may be made based on one or more characteristics of the management task (e.g., the ND 420 from which the management task is received, the type of management task, and the like, as well as various combinations thereof). The management task is then stored in a task table 512 of the management task buffer 510 in which the management task is to be stored. In an embodiment in which the management task buffer 510 includes multiple task tables, a determination is made, for the management task, as to which of the task tables 512 in which the management task should be stored. This determination may be made based on one or more characteristics of the management task (e.g., the ND 420 from which the management task is received, the type of management task, the importance of the management task, and the like, as well as various combinations thereof). As the received management tasks are being stored in the management task buffers 510, management tasks also are being moved from the management task buffers 510 into DB 412. As described herein, within each management task buffer 510, as space becomes available within the circular buffer 514 of the management task buffer 510 the management tasks stored in the task table(s) 512 of the management task buffer 510 are moved into the circular buffer 514 the management task buffer 510. The controller 520 of the management task control module 414 controls writing of the management tasks from the circular buffers 514 of the management task buffers 510 to the DB 412 based on the resource weight parameters of the resource groups with which the management task buffers 510 of management task control module 414 are associated, respectively. An exemplary use of management task control module 414 to move management tasks from management task buffers 510 to DB 412 is depicted and described with respect to FIG. 6.

Figure 6:
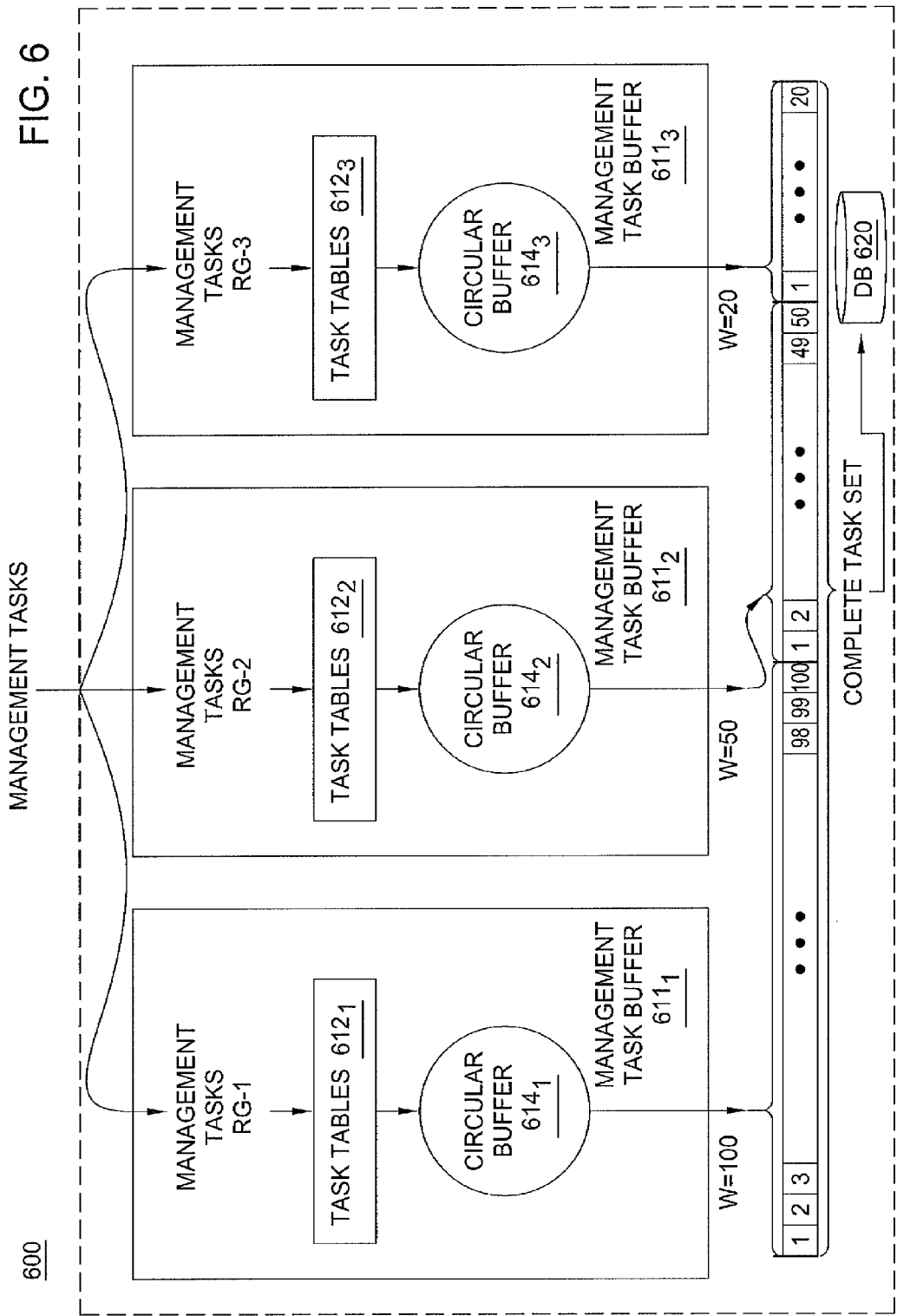
FIG. 6 depicts an exemplary embodiment of the management task control module of FIG. 5 for illustrating use of the management task control module to move management tasks from management task buffers of a management system to a database of a management system.

FIG. 6 depicts an exemplary embodiment of the management task control module of FIG. 5 for illustrating use of the management task control module to move management tasks from management task buffers of a management system to a database of a management system.

As depicted in FIG. 6, the management system 600 includes a management task control module 610 and a database (DB) 620. The management task control module 610 includes three management task buffers $611_1$-$611_3$ (collectively, management task buffers 611) associated with three resource groups (RG-1, RG-2, and RG-3), respectively. The management task buffers $611_1$-$611_3$ include task tables $612_1$-$612_3$ (collectively, task tables 612) and circular buffers $614_1$-$614_3$ (collectively, circular buffers 614), respectively. The management task buffers 611 have respective resource weight parameters of 100, 50, and 20 associated therewith. The various components of management system 600 operate in a manner substantially similar to the corresponding components depicted and described with respect to FIGS. 4 and 5.

As depicted in FIG. 6, management system 600 receives management tasks from NDs managed by management system 600. The management tasks are stored in management task buffers 611 as follows: management tasks associated with NDs which are associated with RG-1 are stored in task tables $612_1$ of management task buffer $611_1$, management tasks associated with NDs which are associated with RG-2 are stored in task tables $612_2$ of management task buffer $611_2$, and management tasks associated with NDs which are associated with RG-3 are stored in task tables $612_3$ of management task buffer $611_3$. The management tasks stored in task tables $612_1$-$612_3$ of management task buffers 611 are moved to circular buffers $614_1$-$614_3$ as space becomes available in circular buffers $614_1$-$614_3$, respectively. A complete task set for storage in DB 620 is formed by incrementing pointers $615_1$-$615_3$ of circular buffers $614_1$-$614_3$ according to the respective resource weight parameters 100, 50, and 20 of RG-1, RG-2, and RG-3 associated with circular buffers $614_1$-$614_3$, respectively, thereby resulting in extraction of 100 management tasks from circular buffer $614_1$ associated with RG-1, extraction of 50 management tasks from circular buffer $614_2$ associated with RG-2, and extraction of 20 management tasks from circular buffer $614_3$ associated with RG-3. The complete task set includes 170 management tasks. The complete task set is then written to DB 620 using resources of the management system.

Figure 7:
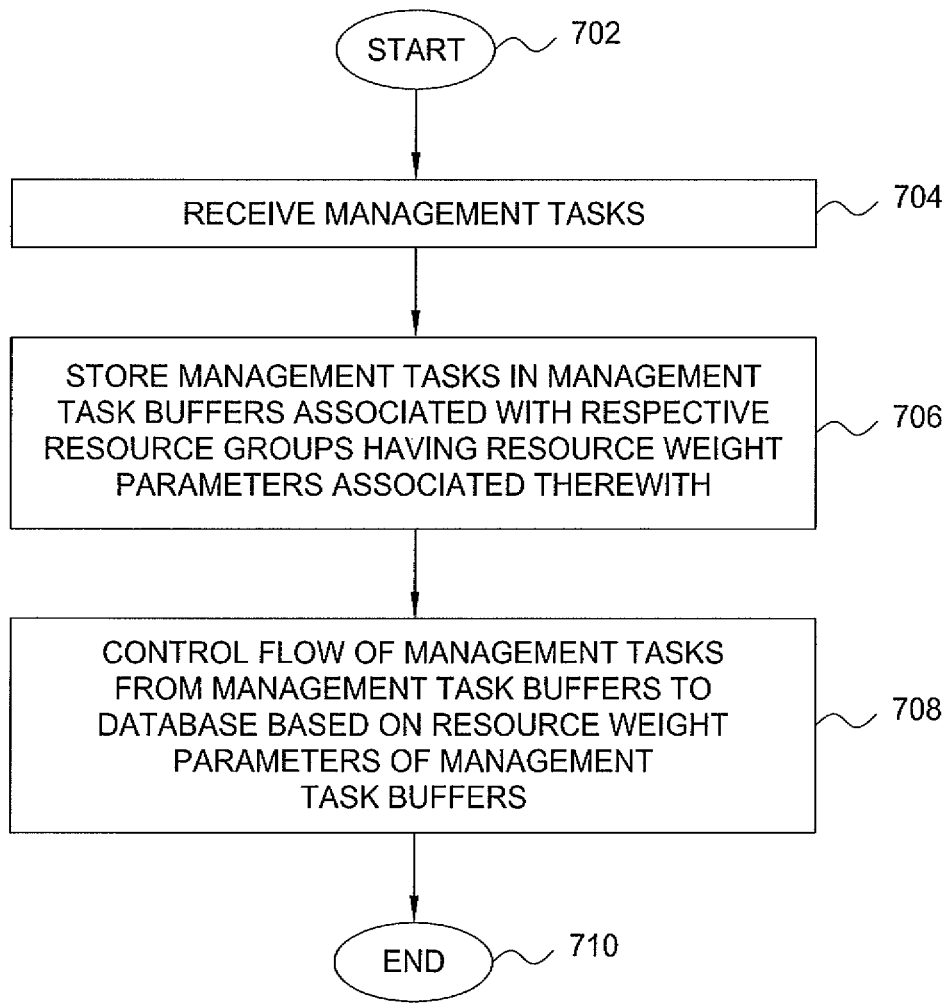
FIG. 7 depicts one embodiment of a method for controlling the flow of management tasks received at a management system to a database of the management system.

FIG. 7 depicts one embodiment of a method for controlling the flow of management tasks received at a management system to a database of the management system.

At step 702, method 700 begins.

At step 704, management tasks are received at the management system. The management tasks are received from network devices managed by the management system.

At step 706, the management tasks are stored in management task buffers of the management system, where the management task buffers are associated with respective resource groups having respective resource weight parameters associated therewith. The storage of management tasks may be implemented using various functions described herein. In one embodiment, for example, storage of management tasks may be implemented as a process including, for each received management task, steps of determining which of the management task buffers in which to store the received management task and, where the management task buffer includes multiple task tables, determining which of the task tables in which to store the received management task. The storage of management tasks in the management task buffers may include various other functions, as depicted and described herein with respect to FIGS. 4-6.

At step 708, the flow of management tasks from the management task buffers to the database is controlled based on the resource weight parameters of the management task buffers. The providing of management tasks from the management task buffers to the database may be implemented using various functions described herein. In one embodiment, for example, management tasks are extracted from the management task buffers and stored in the database serially. In one embodiment, for example, at set of management tasks is extracted from the management task buffers as a first step, and the set of management tasks, once formed, is then written into the database as a second step. The providing of management tasks from the management task buffers to the database may include various other functions, as depicted and described herein with respect to FIGS. 4-6.

At step 710, method 700 ends.

As noted hereinabove, the operation of method 700 may be better understood by way of reference to FIGS. 4-6 depicted and described herein.

As described herein, the management task data storage capability provides various capabilities and advantages.

The management task data storage capability ensures that critical or high priority data is given an appropriate share of database resources relative to noncritical or low priority data, including database access operations. For example, in a telecommunications network, management task data storage capability ensures that relatively high priority data (such as from large switching elements including service gateways and the like), is guaranteed a relatively large amount of database resources, while relatively low priority data (such as from individual subscriber elements and the like) is guaranteed a relatively small amount of database resources. This may result in an increased service life for existing management systems and, more specifically, for existing databases of existing management systems.

The management task data storage capability enables the process supporting various embodiments of the management task data storage capability to be implemented using a single processing thread (although it will be appreciated that multiple processing threads may be used), thereby providing single thread prioritization of management tasks streams of network devices. This single thread prioritization of management tasks streams of network devices, alone or when combined with the resource allocation capability depicted and described with respect to FIGS. 1-3, provides a comprehensive database processing capability that enables use of all available resources in a priority-based manner.

The management task data storage capability ensures that important database updates associated with managed network elements are not pushed aside amid a flurry of less important database updates, ensures that existing infrastructure is used to its full potential, provides mechanisms for managing quality-of-service guarantees, and provides various other advantages and capabilities.

These and other various capabilities and advantages enabled by the management task data storage capability will be understood by way of reference to FIGS. 4-7, both alone as well as in combination with FIGS. 1-3.

As described herein, various mechanisms depicted and described with respect to FIGS. 4-7 may be used in conjunction with various mechanisms depicted and described with respect to FIGS. 1-3. In one embodiment, for example, formation of resource groups associated with management buffers may be performed using various mechanisms depicted and described with respect to FIG. 1-3 (as well as other suitable mechanisms). Similarly, in one embodiment, for example, resource groups of a management system, as depicted and described with respect to FIGS. 1-3, may be used by the management system for controlling storage of management tasks within the database of the management system (e.g., control of resources of a management system for use in storing management tasks within the database of the management system may be provided using various mechanisms depicted and described with respect to FIG. 1-3 (as well as other suitable mechanisms). Various embodiments for enabling a management system to use resource groups for controlling storage of management tasks in the database of the management system are depicted and described herein with respect to FIGS. 4-7. In this sense, in various embodiments, any of the mechanisms depicted and described with respect to FIGS. 1-3 may be combined with any of the mechanisms depicted and described with respect to FIGS. 4-7.

Figure 8:
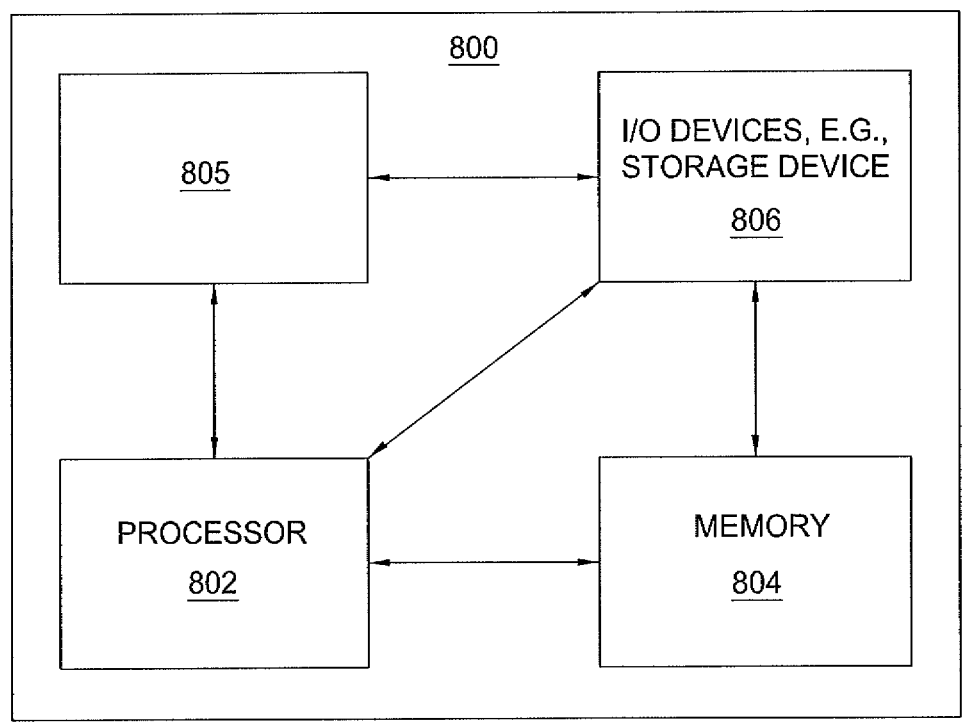
FIG. 8 depicts a high-level block diagram of a general-purpose computer suitable for use in performing the functions described herein.

FIG. 8 depicts a high-level block diagram of a general-purpose computer suitable for use in performing the functions described herein. As depicted in FIG. 8, system 800 comprises a processor element 802 (e.g., a CPU), a memory 804, e.g., random access memory (RAM) and/or read only memory (ROM), a resource allocation module 805, and various input/output devices 806 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the resource allocation process 805 can be loaded into memory 804 and executed by processor 802 to implement the functions as discussed above. As such, resource allocation process 805 (including associated data structures) of the present invention can be stored on a computer readable medium or carrier, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although primarily depicted and described herein with respect to embodiments in which the management system manages a network of communications devices, the resource allocation functions depicted and described herein may be utilized to allocate resources of any management system responsible for managing any types of devices.

Although various embodiments which incorporate the teachings of the present invention have been shown and described in detail herein, those skilled in the art can readily devise many other varied embodiments that still incorporate these teachings.

What is claimed is:

1. An apparatus for managing flow of management task data to a database of a management system configured for managing a network having a plurality of network devices, the apparatus comprising:
   a plurality of management task buffers having a respective plurality of resource groups associated therewith, the plurality of resource groups having respective sets of the network devices associated therewith, the management task buffers configured to receive and store respective sets of management tasks from ones of the network devices in the respective sets of network devices associated with the respective resource groups with which the respective management task buffers are associated, the resource groups having respective portions of resources of the management system allocated thereto and having a respective plurality of weights associated therewith, wherein the weights of the resource groups are indicative of respective numbers of management tasks to be provided from the respective management task buffers to the database during a given time period; and
   a controller configured for controlling flow of the management tasks from the management task buffers to the database based on the weights of the resource groups with which the respective management task buffers are associated.

2. The apparatus of claim 1, wherein at least one of the management task buffers comprises:
   one or more task tables configured for receiving and storing management tasks received at the management task buffer; and
   a circular buffer configured for receiving management tasks from the one or more task tables and storing the management tasks received from the one or more task tables;
   wherein the controller is configured for controlling flow of the management tasks from the circular buffer to the database based on a pointer identifying a location of the circular buffer from which a next management task is to be extracted for propagation to the database.

3. The apparatus of claim 1, wherein the controller is configured for:
   when a management task is received from one of the network devices:
      identifying which of the management task buffers in which the received management task is to be stored; and
      providing the received management task to the identified management task buffer.

4. The apparatus of claim 3, wherein the controller is configured to identify which of the management task buffers in which the received management task is to be stored based on identification of the one of the network devices from which the management task is received.

5. The apparatus of claim 1, wherein the management task buffers comprises respective sets of task tables configured for storing management tasks received at the respective management task buffers.

6. The apparatus of claim 5, wherein, for at least one of the management task buffers, the set of management task tables of the management task buffer comprises at least one of:
   a trap table for storing traps received at the management task buffer;
   a statistics table for storing statistics received at the management task buffer; and
   a resync table for storing resync commands received at the management task buffer.

7. The apparatus of claim 5, wherein each of the management task buffers comprises a respective circular buffer.

8. The apparatus of claim 7, wherein, for each of the management task buffers, the circular buffer of the management task buffer is configured to:
   receive management tasks from the set of task tables of the management task buffer; and
   store the management tasks from the set of task tables of the management task buffer.

9. The apparatus of claim 7, wherein, for each of the management task buffers, the respective circular buffer of the management task buffer comprises a plurality of buffer locations configured to store respective ones of the management tasks stored by the management task buffer.

10. The apparatus of claim 7, wherein, for each of the management task buffers, the respective circular buffer of the management task buffer has a respective pointer associated therewith.

11. The apparatus of claim 10, wherein the pointer of the circular buffer identifies a location of the circular buffer from which a next management task is to be extracted by the controller.

12. The apparatus of claim 10, wherein the controller is configured for incrementing the pointers of the respective circular buffers based on the weights of the resource groups with which the respective management task buffers are associated.

13. The apparatus of claim 1, wherein each of the management task buffers comprises a plurality of task tables configured for storing respective sets of management tasks received at the respective management task buffers.

14. The apparatus of claim 13, wherein the controller is configured for:
when a management task associated with one of the management task buffers is received:
identifying which of the task tables of the management task buffer in which the received management task is to be stored; and
providing the received management task to the identified task table of the management task buffer.

15. The apparatus of claim 14, wherein the controller is configured to identify which of the task tables of the management task buffer in which the received management task is to be stored based on identification of a task type of the received management task.

16. The apparatus of claim 1, wherein the controller is configured for controlling flow of management tasks from the management task buffers to the database by:
forming a complete task set for storage in the database, wherein the complete task set includes at least one management task from each of the management task buffers in relative proportion to the weights of the resource groups of the management task buffers; and
committing the complete task set to the database.

17. The apparatus of claim 1, wherein the resource groups are formed by:
grouping the network devices into a plurality of network device groups based on at least one characteristic associated with each of the network devices, wherein the at least one characteristic of each network device is indicative of an importance of the network device to the provider; and
allocating respective portions of the resources of the management system to the network device groups based on a respective importance of each network device group.

18. A non-transitory computer readable storage medium storing instructions which, when executed by a computer, cause the computer to perform a method for managing flow of management task data to a database of a management system configured for managing a network having a plurality of network devices, the method comprising:
receiving management tasks at the management system, the management system comprising a plurality of management task buffers;
storing the management tasks using the management task buffers, the management task buffers having a respective plurality of resource groups associated therewith, the plurality of resource groups having respective sets of the network devices associated therewith, the management task buffers configured to receive and store respective sets of management tasks from ones of the network devices in the respective sets of network devices associated with the respective resource groups with which the respective management task buffers are associated, the resource groups having respective portions of resources of the management system allocated thereto and having a respective plurality of weights associated therewith, wherein the weights of the resource groups are indicative of respective numbers of management tasks to be provided from the respective management task buffers to the database during a given time period; and
controlling flow of the management tasks from the management task buffers to the database based on the weights of the resource groups with which the respective management task buffers are associated.

19. A method for managing flow of management task data to a database of a management system configured for managing a network having a plurality of network devices, the method comprising:
receiving management tasks at the management system, the management system comprising a plurality of management task buffers;
storing the management tasks using the management task buffers, the management task buffers having a respective plurality of resource groups associated therewith, the plurality of resource groups having respective sets of the network devices associated therewith, the management task buffers configured to receive and store respective sets of management tasks from ones of the network devices in the respective sets of network devices associated with the respective resource groups with which the respective management task buffers are associated, the resource groups having respective portions of resources of the management system allocated thereto and having a respective plurality of weights associated therewith, wherein the weights of the resource groups are indicative of respective numbers of management tasks to be provided from the respective management task buffers to the database during a given time period; and
controlling flow of the management tasks from the management task buffers to the database based on the weights of the resource groups with which the respective management task buffers are associated.

* * * * *